United States Patent [19]

Yokota

[11] Patent Number: 4,518,316

[45] Date of Patent: May 21, 1985

[54] PRESSURE SUSTAINING APPARATUS

[75] Inventor: Mitsuyoshi Yokota, Hyogo, Japan

[73] Assignee: Mitsubishi Denki Kabushiki Kaisha, Tokyo, Japan

[21] Appl. No.: 527,736

[22] Filed: Aug. 30, 1983

[30] Foreign Application Priority Data

Sep. 10, 1982 [JP] Japan .................. 57-138510[U]

[51] Int. Cl.³ ............................................... F04B 49/00
[52] U.S. Cl. .................................... 417/12; 307/118; 417/44
[58] Field of Search ............... 417/12, 36, 38, 40, 417/44, 63, 54, 45; 307/118, 102

[56] References Cited

U.S. PATENT DOCUMENTS

| | | | |
|---|---|---|---|
| 1,786,114 | 12/1930 | Hughes | 417/12 |
| 2,246,932 | 6/1941 | Collins | 417/62 |
| 3,726,607 | 4/1973 | Garman | 417/44 X |
| 3,730,645 | 5/1973 | Mashakaru et al. | 417/12 |
| 3,814,542 | 6/1974 | Iglesias et al. | 417/12 |
| 4,164,664 | 8/1979 | Kasiewicz | 307/118 |
| 4,171,932 | 10/1979 | Miller | 417/44 X |
| 4,201,517 | 5/1980 | Ferguson | 417/12 |

FOREIGN PATENT DOCUMENTS 20102 2/1978 Japan .................................. 417/12

OTHER PUBLICATIONS

1982 Oldsmobile Cutlass Ciera and Omega Service Manual, 9/15/81, Service Department, Oldsmobile Division, General Motors Corporation.

Primary Examiner—Edward K. Look
Attorney, Agent, or Firm—Wenderoth, Lind & Ponack

[57] ABSTRACT

A pressure sustaining apparatus which can be used for a braking force magnification apparatus for a vehicle includes a control circuit which energizes a DC motor and a vacuum pump or a compressor associated with the DC motor. When the absolute value of the gauge pressure generated by the pump or compressor reaches a predetermined threshold pressure, a sensor detects this condition and opens its contacts in response thereto. The contacts are connected to the control circuit which electrically energizes the DC motor for a predetermined length of time after the contacts of the sensor are opened. The predetermined length of time is determined by a time constant of a timer circuit included in the control circuit.

12 Claims, 5 Drawing Figures

PRESSURE SUSTAINING APPARATUS

BACKGROUND OF THE INVENTION

This invention relates to pressure sustaining apparatuses, and in particular to pressure sustaining apparatuses which can be used in a braking force magnification apparatus for a vehicle.

In conventional braking apparatuses for vehicles, only a foot braking force was available and so the braking effect was not satisfactory. However, in recent braking apparatuses, a greater braking effect has been required due to road conditions and other factors, and there have been an increasing number of vehicles that utilize a braking force magnification apparatus which produces a greater braking effect than can be achieved by the foot alone. A braking force magnification apparatus with pressure generating means included therein can generate a pressure different from atmospheric pressure so that the difference between the generated pressure and atmospheric pressure may be available for braking operations. Accordingly, a braking force magnification apparatus requires a pressure sustaining apparatus which can sustain the generated pressure.

One example of such a pressure sustaining apparatus used in the past is shown in FIG. 1 by a circuit diagram. In the figure, the pressure sustaining apparatus is generally shown by reference numeral 10 in which a vacuum pump 12 and a DC motor 14 connected to the pump 12 form pressure generating means. The DC motor 14 is connected to the positive terminal of a DC power source 16 through a key switch 18, and the negative terminal of the source 16 is grounded. The motor 14 is also connected to a control circuit 20 surrounded by dotted lines. The control circuit 20 is connected to ground via a sensor 22. The vacuum pump 12 produces a negative gauge pressure in a vacuum booster or a reserve tank (both not shown), the negative pressure serving as a mechanical power source for braking operations. The sensor 22 has contacts included therein as shown in the figure and is provided within the vacuum booster or the reserve tank so that the contacts are closed to provide an output signal when the absolute pressure in the vacuum booster generated by the vacuum pump 12 rises above a predetermined threshold value. The control circuit 20 includes resistors R1 and R2 connected in series between one terminal of the key switch 18 and ground. The junction of the resistors R1 and R2 is connected to one of the contacts of the sensor 22 also to the base of a transistor Q1 whose emitter is grounded and whose collector is connected through a resistor R3 to the key switch 18 and to the base of a transistor Q2 whose emitter is grounded and whose collector is connected to the DC motor 14 and to the anode of a diode D which is connected in parallel with the DC motor 14 and is connected to the key switch 18.

A conventional apparatus thus constructed closes the contacts of the sensor 22 when the absolute pressure within the vacuum booster is approximately equal to atmospheric pressure before the vehicle (not shown) in which it is installed is started. In this condition, when the key switch 18 is closed, the transistor Q1 is not conductive because its base is grounded and so the transistor Q2 is made conductive by the base current supplied through the resistor R3 from the power source 16. Therefore, the DC motor 14 is energized to reduce the absolute pressure within the vacuum booster through the vacuum pump 12. When the absolute pressure falls to a predetermined threshold value, the contacts of the sensor 22 are opened, thereby making the transistor Q1 conductive while the transistor Q2 is made non-conductive to deenergize the motor 14 or to stop the operation of the motor 14.

In such a conventional apparatus in which the vacuum booster has a small volume, as soon as the DC motor 14 is deenergized the formation of a vacuum by the vacuum pump 12 is stopped and the absolute pressure in the vacuum booster again rises above the predetermined threshold value, and the sensor 22 detects that condition. Therefore, the DC motor 14 is immediately energized again to operate the vacuum pump 12, resulting in disadvantageous hunting which adversely effects the durability of the apparatus.

SUMMARY OF THE INVENTION

It is accordingly a primary object of the invention to provide a pressure sustaining apparatus which is capable of eliminating such hunting, thereby enhancing the durability of the apparatus.

In light of this object, the present invention comprises a pressure generating means, a sensor, and a control circuit. The pressure generating means generate a pressure different from atmospheric pressure when energized. The sensor produces an output signal when the absolute value of the gauge pressure generated by the pressure generating means falls below a predetermined threshold value. The control circuit energizes the pressure generating means when the output signal from the sensor is produced. The control circuit includes means for continuously energizing the pressure generating means for a predetermined length of time even after the output signal from the sensor is terminated.

The pressure generating means preferably comprises a DC motor connected to the control circuit and a vacuum pump or a compressor connected to the DC motor. The sensor preferably has contacts which are opened when the absolute value of the gauge pressure generated by the pressure generating means exceeds the predetermined threshold value.

The continuously energizing means preferably comprises a timer circuit, consisting of a resistor and a capacitor, connected across the sensor.

BRIEF DESCRIPTION OF THE DRAWINGS

Further objects and advantages of the present invention will be apparent from the following description, reference being had to the accompanying drawings wherein preferred embodiments of the present invention are clearly shown.

DETAILED DESCRIPTION OF THE INVENTION

Figure 1:
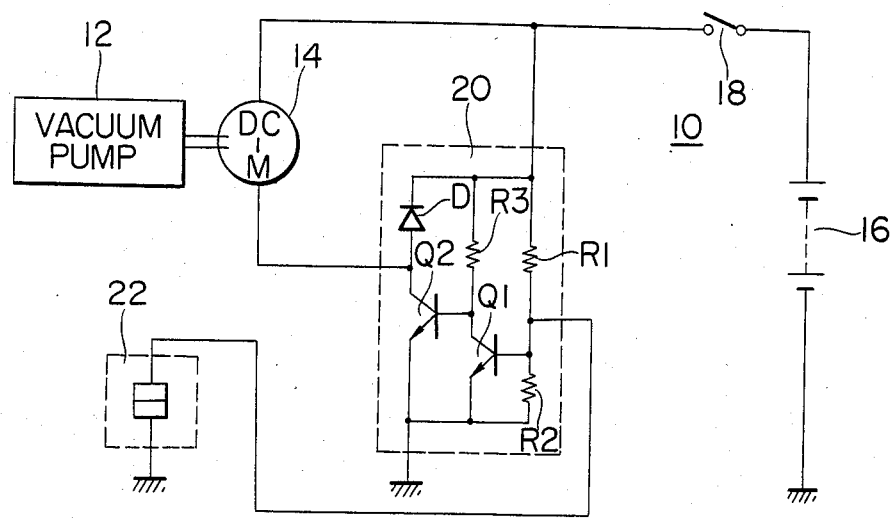
FIG. 1 is a circuit diagram of a pressure sustaining apparatus in accordance with the prior art.
Figure 2:
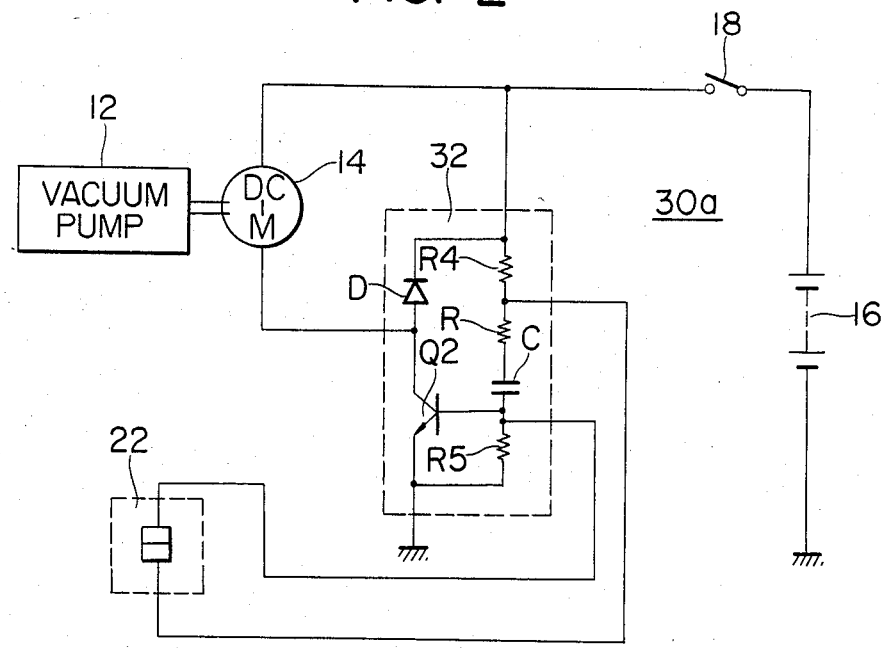
FIG. 2 is a circuit diagram of a pressure sustaining apparatus in accordance with the first preferred embodiment of the present invention.

Referring now to the drawings, wherein like reference numerals designate like or corresponding parts throughout the drawings, FIG. 2 shows one embodiment of a pressure sustaining apparatus, generally designated by reference numeral 30a, in accordance with the present invention which differs from the conventional apparatus in FIG. 1 only with regard to the arrangement of the control circuit and the sensor. In FIG. 2, a control circuit 32 embraced by dotted lines includes a timer circuit, consisting of a series combination of a resistor R and a capacitor C, connected across the contacts of a sensor 22. As shown, the resistor R is connected to a resistor R4 which is connected to the junction of a DC motor 14 and a key switch 18 and to the cathode of a diode D. The capacitor C is connected to the base of a transistor Q2 and to a base-bias resistor R5 which is connected to ground together with the emitter of the transistor Q2.

In the operation of the pressure sustaining apparatus according to the present invention thus constructed, the contacts of the sensor 22 are initially closed because the absolute pressure in the vacuum booster (not shown) connected to a vacuum pump 12, which together with the DC motor 14 forms pressure generating means, is approximately equal to atmospheric pressure at the instant the key switch 18 is closed. Therefore, the timer circuit consisting of the resistor R and the capacitor C is short-circuited, thereby making the transistor Q2 conductive and continuously energizing the DC motor 14 and the vacuum pump 12 the same as in the conventional apparatus.

When the absolute pressure in the vacuum booster decreases to the predetermined threshold value, the sensor 22 detects this condition and opens its contacts. Therefore, the DC bias circuit of the transistor Q2, which had been serially formed by the resistor R4 and the contacts of the sensor 22 between the positive pole of the DC power supply 16 and the base of the transistor Q2, is no longer formed. Instead, the base of the transistor Q2 is now connected through the timer circuit, consisting of the resistor R and the capacitor C, and through the resistor R4 to the DC power supply 16 and so is further supplied with DC current until the charging of the capacitor C of the timer circuit has been completed. Consequently, the DC motor 14 continues to operate for a predetermined length of time determined by the time constant of the timer circuit and by the resistor R4 even after the absolute pressure in the vacuum booster has fallen to the predetermined threshold value. Therefore, the absolute pressure in the vacuum booster falls below the predetermined threshold value. Thus, even though the absolute pressure in the vacuum booster may vary somewhat immediately after the operation of the DC motor 14 is stopped, the variation in the absolute pressure in the vacuum booster will not be large enough for the absolute pressure to rise above the threshold valve. The sensor 22 will not energize the motor 14, and hunting will not occur.

When the contacts of the sensor 22 are closed, the contacts discharge the capacitor C of the timer circuit through the resistor R.

Figure 3:
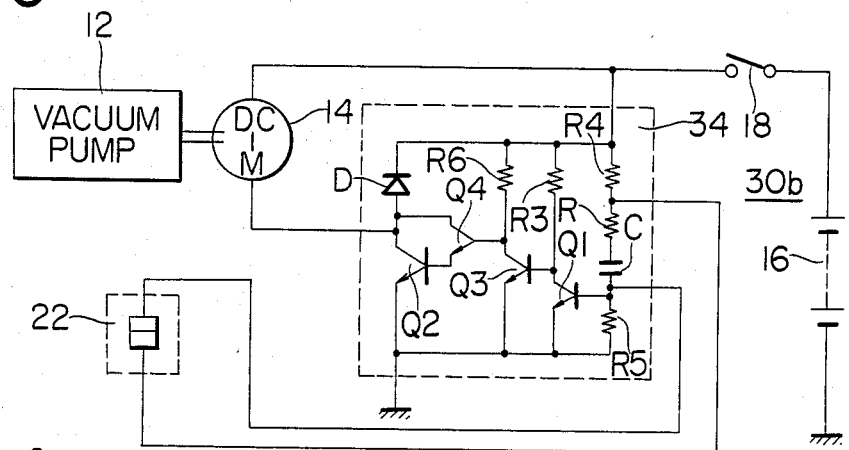
FIG. 3 is a circuit diagram of a pressure sustaining apparatus in accordance with the second preferred embodiment of the present invention.

In FIG. 3 is shown a second preferred embodiment of the pressure sustaining apparatus in accordance with the present invention, generally designated by a reference numeral 30b. This pressure sustaining apparatus 30b includes a different arrangement of the control circuit, generally designated by a reference numeral 34. The control circuit 34 embraced by the dotted lines also includes a timer circuit, consisting of a resistor R and a capacitor C, connected across the contacts of a sensor 22. One end of the timer circuit is connected through a resistor R4 and a key switch 18 to the positive terminal of a DC power supply 16 and the other end thereof is grounded through a resistor R5 across which the base and the emitter of a transistor Q1 are connected. The collector of the transistor Q1 is connected to a resistor R3 which is connected to the key switch 18 and to the base of a transistor Q3 whose emitter is grounded and whose collector is connected to a resistor R6 which is connected to the key switch 18. The collector of the transistor Q3 is also connected to the base of a transistor Q4 whose collector is connected through a diode D to the key switch 18 and whose emitter is connected to the base of a transistor Q2. The collector and the emitter of the transistor Q2 are connected respectively to the anode of the diode D across which a DC motor 14 is connected and to ground, similar to the circuits of FIGS. 1 and 2. It will be noted that the transistors Q4 and Q2 form a so-called "Darlington circuit".

In operation, when the key switch 18 is closed, the pressure in the vacuum booster is substantially the same as atmospheric pressure, so the contacts of the sensor 22 are closed as described above. Therefore, the resistor R and the capacitor C are at that time short-circuited by the sensor 22, causing a DC bias current to flow from the DC power supply 16 through the key switch 18 and the resistor R4 to the base of the transistor Q1. This base current makes the transistor Q1 conductive and the transistor Q3 non-conductive. In turn, both of the transistors Q4 and Q2, which form a Darlington circuit, are made conductive to initiate the operation or the energization of the DC motor 14 as well as the vacuum pump 12 which is connected to the vacuum booster (not shown). Therefore, the absolute pressure within the vacuum booster is gradually decreased, and when it falls to the predetermined threshold value as described above the contacts of the sensor 22 are opened. However, the base current of the transistor Q1 continues to flow through the resistors R4 and R and the capacitor C for a predetermined length of time even after the contacts of the sensor 22 have been opened. The predetermined length of time is determined by the time constant which is determined by the resistors R4 and R and the capacitor C. Therefore, the vacuum pump 12 and the DC motor 14 which form pressure generating means also continue to operate for the predetermined length of time.

When the capacitor C is fully charged, no base current flows through the transistor Q1, thereby making the transistor Q3 conductive and the transistors Q4 and Q2 non-conductive to deenergize the DC motor 14 and the vacuum pump 12.

Also in this embodiment, the existence of the timer circuit eliminates the hunting of the pressure generating means formed by the vacuum pump 12 and the DC motor 14 because the absolute pressure within the vacuum booster is kept below the predetermined threshold pressure by the further energization during the predetermined length of time. When the absolute pressure rises above the predetermined threshold value, the contacts of the sensor 22 discharge the capacitor C.

Figure 4:
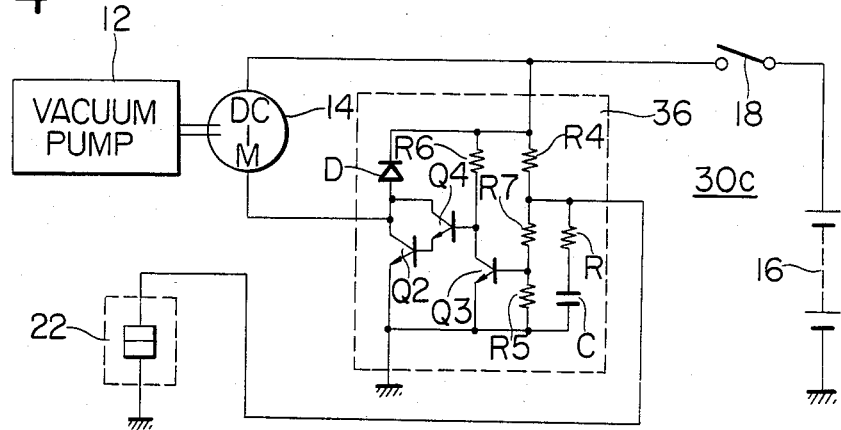
FIG. 4 is a circuit diagram of a pressure sustaining apparatus in accordance with the third preferred embodiment of the present invention; and, FIG. 5 is a circuit diagram of a pressure sustaining apparatus in accordance with the fourth preferred embodiment of the present invention.

FIG. 4 shows a third preferred embodiment of the pressure sustaining apparatus in accordance with the present invention, generally designated by a reference numeral 30c which includes another arrangement of the control circuit, generally designated by reference numeral 36.

In this control circuit 36 embraced by dotted lines, a DC voltage divider circuit for a DC power source 16 is formed by a resistor R4, a resistor R7, and a resistor R5. A timer circuit consisting of a resistor R and a capacitor C is connected across the series combination of resistors R7 and R5 as shown in the figure. The contacts of a sensor 22 are connected between ground and the junction of the timer circuit and the resistor R4. The base of a transistor Q3 is connected to the junction of resistors R7 and R5. Otherwise, the arrangement of the control circuit 36 in FIG. 4 is the same as that in FIG. 3.

In operation, when the key switch 18 is closed, the absolute pressure in the vacuum booster is substantially the same as atmospheric pressure, so that the contacts of the sensor 22 are closed as described above. The timer circuit consisting of the resistor R and the capacitor C as well as the series combination of the resistors R7 and R5 are short-circuited to make the transistor Q3 non-conductive. Therefore, the transistors Q4 and Q2 forming a "Darlington circuit" are made conductive to energize the pressure generating means formed by the vacuum pump 12 and the DC motor 14, thereby decreasing the absolute pressure in the vacuum booster (not shown) connected to the vacuum pump 12.

Although the contacts of the sensor 22 are opened when the absolute pressure within the vacuum booster falls to the predetermined threshold pressure, the transistor Q3 is kept non-conductive for a predetermined length of time determined by the time constant of the resistors R4 and R with the capacitor C, and so the absolute pressure within the vacuum booster falls below the predetermined threshold value. Therefore, the arrangement of the pressure sustaining apparatus in FIG. 4 may also prevent hunting of the DC motor 14 in a fashion which is similar to the embodiments in FIGS. 2 and 3.

Figure 5:
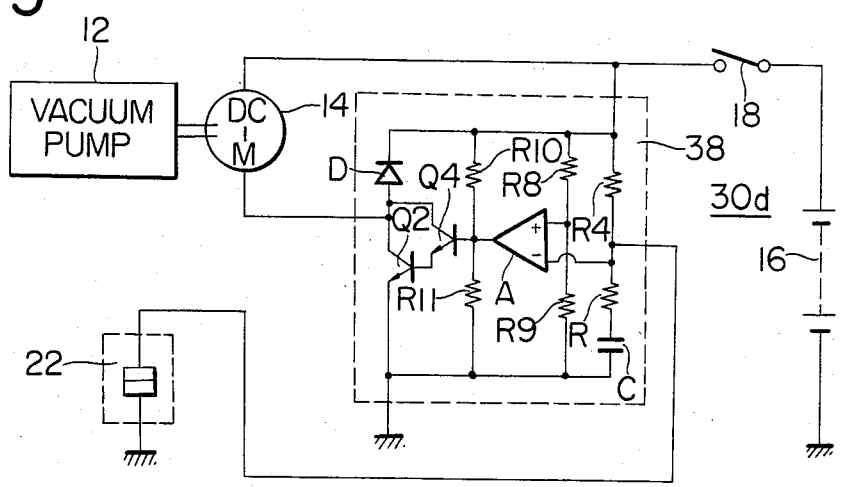

FIG. 5 shows a fourth preferred embodiment of the pressure sustaining apparatus in accordance with the present invention, generally designated by reference numeral 30d which includes still another arrangement of the control circuit, generally designated by reference numeral 38.

In this control circuit 38, surrounded by dotted lines, a voltage comparator A has its non-inverting input connected to the junction of resistors R8 and R9 which form a voltage divider of the DC voltage of a power supply 16 and so provide a reference voltage. The inverting input of the comparator A is connected to the junction of a resistor R4 and the series combination (timer circuit) of a resistor R and a capactior C. The output of the comparator A is connected to the junction of resistors R10 and R11 which also form a voltage divider, and is connected to the base of a transistor Q4 which forms a "Darlington circuit" together with transistor Q2, as in FIGS. 3 and 4. Otherwise, the arrangement of the pressure sustaining apparatus 30d in FIG. 5 is the same as that in FIG. 4.

In this embodiment, when the key switch 18 is closed, the contacts of the sensor 22 are closed to short-circuit the timer circuit consisting of the resistor R and the capacitor C so that the inverting input of the comparator A is grounded. Therefore, the output of the comparator A has a high level which makes the Darlington circuit formed by the transistors Q4 and Q2 conductive to energize the DC motor 14 as in FIGS. 3 and 4. The energization of the DC motor 14 and the vacuum pump 12 which form pressure generating means decreases the absolute pressure in the vacuum booster (not shown) connected to the vacuum pump 12. When the absolute pressure in the vacuum booster has fallen to the predetermined threshold value as described above, the contacts of the sensor 22 are opened to initiate a charging current for the capacitor C with a time constant determined by the resistors R4 and R and the capacitor C. As a result, the comparator A still continues to provide a high level output until the charging of the capacitor C is completed. Therefore, the absolute pressure within the vacuum booster falls below the predetermined threshold value.

When the charging of the capacitor C is completed, the inverting input of the comparator A becomes higher than the non-inverting reference input and the output of the comparator A has a low level which makes the Darlington circuit of the transistors Q4 and Q2 non-conductive and in turn deenergizes the DC motor 14 and the vacuum pump 12. However, the contacts of the sensor 22 will not be closed until the absolute pressure within the vacuum booster has risen above the predetermined threshold value, so that hunting of the DC motor 14 is prevented.

In all of the preferred embodiments described above, a vacuum pump has been employed as pressure generating means for producing an absolute pressure below atmospheric pressure (i.e. a negative gauge pressure) in the vacuum booster. Alternatively, a compressor for producing an absolute pressure which is greater than atmospheric pressure (i.e. a positive gauge pressure) in the vacuum booster may be employed as pressure generating means. In this manner, a pressure sustaining apparatus with a large capacity may be formed, since the compressor can produce any desired pressure.

If a compressor is used, the sensor 22 provides an output signal when the absolute pressure in the vacuum booster falls below some threshold value. As stated earlier, when a vacuum pump is used, the sensor 22 provides an output signal when the absolute pressure in the vacuum booster exceeds some predetermined threshold value.

Accordingly, in order to cover the case when a vacuum pump is used and the case when a compressor is used, the claims in the present application claim a sensor for providing an output signal when the absolute value of the gauge pressure generated by the pressure generating means falls below a predetermined threshold value.

It will be apparent that the pressure sustaining apparatus according to the invention, as described above, includes a control circuit arranged to continuously energize the pressure generating means for a predetermined length of time even after the pressure generated by the pressure generating means has reached a predetermined threshold value, so that the pressure upon the deenergization of the pressure generating means has a sufficient margin with respect to the predetermined threshold value at which the sensor provides an output. Accordingly, hunting is prevented and the durability of the apparatus is improved.

What is claimed is:
1. A pressure sustaining apparatus comprising:
   a pressure generating means for generating a pressure which is different from atmospheric pressure when energized;

a sensor for providing an output signal when the absolute value of the gauge pressure generated by said pressure generating means falls below a predetermined threshold value; and, a control circuit for energizing said pressure generating means when the output signal from said sensor is provided, said control circuit including means for continuously energizing said pressure generating means for a predetermined length of time after the output signal from said sensor is terminated;

wherein said pressure generating means includes a DC motor connected to said control circuit;

wherein said sensor has contacts which are opened when the negative value of the gauge pressure generated by said pressure generating means exceeds said predetermined threshold value;

wherein said continuously energizing means comprise a timer circuit, consisting of a resistor and a capacitor, connected across said sensor;

further comprising a DC power source connected to said DC motor and a diode connected to the positive terminal of said DC power source;

and wherein said control circuit further includes a first transistor having its base connected to one end of said timer circuit, having its collector connected through a parallel combination of said diode and said DC motor to the positive terminal of said DC power source, and having its emitter connected to ground.

2. A pressure sustaining apparatus is in claim 1, wherein said pressure generating means also includes a vacuum pump which is mechanically connected to said DC motor.

3. A pressure sustaining apparatus as in claim 1, wherein said pressure generating means also includes a compressor which is mechanically connected to said DC motor.

4. A pressure sustaining apparatus comprising:
a pressure generating means for generating a pressure which is different from atmospheric pressure when energized;
a sensor for providing an output signal when the absolute value of the gauge pressure generated by said pressure generating means falls below a predetermined threshold value; and
a control circuit for energizing said pressure generating means when the output signal from said sensor is provided, said control circuit including means for continuously energizing said pressure generating means for a predetermined length of time after the output signal from said sensor is terminated;
wherein said pressure generating means includes a DC motor connected to said control circuit;
wherein said sensor has contacts which are opened when the negative value of the gauge pressure generated by said pressure generating means exceeds said predetermined threshold value;
wherein said continuously energizing means comprise a timer circuit, consisting of a resistor and a capacitor, connected across said sensor;
further comprising a DC power source connected to said DC motor and a diode connected to the positive terminal of said DC power source;
and wherein:
said control circuit further includes first, second, third, and fourth transistors;
said first and second transistors form a Darlington circuit;
the common collector of said Darlington circuit is connected through a parallel combination of said diode and said DC motor to the collectors of said third and fourth transistors as well as to the bases of said second and third transistors, to one end of said timer circuit, and to the positive terminal of said DC source;
the base of said fourth transistor is connected to the other end of said timer circuit; and
the emitters of said first, third, and fourth transistors are grounded.

5. A pressure sustaining apparatus is in claim 4, wherein said pressure generating means also includes a vacuum pump which is mechanically connected to said DC motor.

6. A pressure sustaining apparatus is in claim 4, wherein said pressure generating means also includes a compressor which is mechanically connected to said DC motor.

7. A pressure sustaining apparatus comprising:
a pressure generating means for generating a pressure which is different from atmospheric pressure when energized;
a sensor for providing an output signal when the absolute value of the gauge pressure generated by said pressure generating means falls below a predetermined threshold value; and,
a control circuit for energizing said pressure generating means when the output signal from said sensor is provided, said control circuit including means for continuously energizing said pressure generating means for a predetermined length of time after the output signal from said sensor is terminated;
wherein said pressure generating means includes a DC motor connected to said control circuit;
wherein said sensor has contacts which are opened when the negative value of the gauge pressure generated by said pressure generating means exceeds said predetermined threshold value;
wherein said continuously energizing means comprise a timer circuit, consisting of a resistor and a capacitor, connected across said sensor;
further comprising a DC power source connected to said DC motor and a diode connected to the positive terminal of said DC power source;
and wherein:
said control circuit further includes first, second, and third transistors;
said first and second transistors form a Darlington circuit;
the common collector of said Darlington circuit is connected through a parallel combination of said diode and said DC motor to the collector of said third transistor as well as to the base of said second transistor, to one end of said timer circuit, and to the positive terminal of said DC power source;
the base of said third transistor is connected across said timer circuit; and
the emitter of said first and third transistors and one contact of said sensor are grounded.

8. A pressure sustaining apparatus is in claim 7, wherein said pressure generating means also includes a vacuum pump which is mechanically connected to said DC motor.

9. A pressure sustaining apparatus is in claim 7, wherein said pressure generating means also includes a compressor which is mechanically connected to said DC motor.

10. A pressure sustaining apparatus comprising:
a pressure generating means for generating a pressure which is different from atmospheric pressure when energized;
a sensor for providing an output signal when the absolute value of the gauge pressure generated by said pressure generating means falls below a predetermined threshold value; and,
a control circuit for energizing said pressure generating means when the output signal from said sensor is provided, said control circuit including means for continuously energizing said pressure generating means for a predetermined length of time after the output signal from said sensor is terminated;
wherein said pressure generating means includes a DC motor connected to said control circuit;
wherein said sensor has contacts which are opened when the negative value of the gauge pressure generated by said pressure generating means exceeds said predetermined threshold value;
wherein said continuously energizing means comprise a timer circuit, consisting of a resistor and a capacitor, connected across said sensor;
further comprising a DC power source connected to said DC motor and a diode connected to the positive terminal of said DC power source; and wherein:
said control circuit further includes a voltage comparator and first and second transistors which form a Darlington circuit;
the common collector of said Darlington circuit is connected through a parallel combination of said diode and said DC motor to one end of said timer circuit and to the positive terminal of said DC power source;
the non-inverting input of said comparator is connected across said DC power source;
the inverting input of said comparator is connected to one end of said timer circuit;
the output of said comparator is connected across said DC power source and to the base of said second transistor; and
the emitter of said first transistor, the other end of said timer circuit, and one contact of said sensor are grounded.

11. A pressure sustaining apparatus is in claim 10, wherein said pressure generating means also includes a vacuum pump which is mechanically connected to said DC motor.

12. A pressure sustaining apparatus is in claim 10, wherein said pressure generating means also includes a compressor which is mechanically connected to said DC motor.

* * * * *